(12) United States Patent
Hong

(10) Patent No.: US 11,350,394 B2
(45) Date of Patent: May 31, 2022

(54) RESOURCE CONFIGURATION METHOD, APPARATUS, USER EQUIPMENT, AND BASE STATION

(71) Applicant: XIAOMI COMMUNICATIONS CO., LTD., Beijing (CN)

(72) Inventor: Wei Hong, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 76 days.

(21) Appl. No.: 16/862,836

(22) Filed: Apr. 30, 2020

(65) Prior Publication Data

US 2020/0260436 A1 Aug. 13, 2020

Related U.S. Application Data

(63) Continuation of application No. PCT/CN2017/113623, filed on Nov. 29, 2017.

(51) Int. Cl.
| | |
|---|---|
| *H04W 72/04* | (2009.01) |
| *H04L 5/00* | (2006.01) |
| *H04W 72/08* | (2009.01) |

(52) U.S. Cl.
CPC ....... *H04W 72/0413* (2013.01); *H04L 5/0053* (2013.01); *H04W 72/042* (2013.01); *H04W 72/0446* (2013.01)

(58) Field of Classification Search
CPC ........... H04W 72/0413; H04W 72/042; H04W 72/044; H04W 72/0446; H04W 72/08; H04L 5/0053; H04L 5/001
See application file for complete search history.

(56) References Cited

U.S. PATENT DOCUMENTS

| | | | |
|---|---|---|---|
| 2010/0248651 A1 | 9/2010 | Dent | |
| 2011/0105112 A1* | 5/2011 | Cave | H04W 36/0085 |
| | | | 455/424 |

(Continued)

FOREIGN PATENT DOCUMENTS

| | | |
|---|---|---|
| CN | 102571269 A | 7/2012 |
| CN | 106465134 A | 2/2017 |
| CN | 107148085 A | 9/2017 |

OTHER PUBLICATIONS

Infineon Technologies, "Proposal for UE ACS Test Parameters Change", TSGR4#8(99)652, TSG-RAN Working Group4 Meeting #8; Sophia Antipolis, Oct. 26-29, 1999, 3 pgs.

(Continued)

*Primary Examiner* — Faruk Hamza
*Assistant Examiner* — Abusayeed M Haque
(74) *Attorney, Agent, or Firm* — Oblon, McClelland, Maier & Neustadt, L.L.P.

(57) ABSTRACT

The present disclosure relates to a resource configuration method, apparatus, user equipment, and base station. The resource configuration method can include receiving transmission capability indication information reported by a UE, the transmission capability indication information being configured for indicating transmission capability of the UE over different channel combinations in different frequency band combinations, and configuring time frequency resources supporting dual uplink transmission or time frequency resources supporting single uplink transmission for the user equipment based on the transmission capability indication information.

8 Claims, 6 Drawing Sheets

(56) References Cited

U.S. PATENT DOCUMENTS

| | | | | |
|---|---|---|---|---|
| 2014/0056243 A1* | 2/2014 | Pelletier | ................ | H04W 76/15 |
| | | | | 370/329 |
| 2019/0320463 A1* | 10/2019 | Yamada | ................ | H04W 16/14 |
| 2019/0357239 A1* | 11/2019 | Moon | ................... | H04L 5/0007 |
| 2020/0305094 A1* | 9/2020 | Ouchi | ................... | H04W 76/27 |
| 2020/0328501 A1* | 10/2020 | Kang | ....................... | H01Q 9/30 |
| 2021/0144524 A1* | 5/2021 | Byun | ................... | H04W 24/10 |
| 2021/0266915 A1* | 8/2021 | Sirotkin | ............. | H04W 72/085 |

OTHER PUBLICATIONS

Ericsson, ST-Ericsson, "DC-HSUPA related receiver requirements". R4-100121, TSG-RAN Working Group 4 (Radio) meeting Ad Hoc #1, Sophia Antipolis, Jan. 18-22, 2010, 5 pgs.

International Search Report issued in International Application No. PCT/CN2017/113623 (w/English translation).

* cited by examiner

RESOURCE CONFIGURATION METHOD, APPARATUS, USER EQUIPMENT, AND BASE STATION

CROSS-REFERENCE TO RELATED APPLICATION

The present application is a Continuation Application of PCT Application No. PCT/CN2017/113623, filed on Nov. 29, 2017, the entire contents of which are incorporated herein by reference.

TECHNICAL FIELD

The present disclosure relates to the field of communication technologies, and in particular, to a resource configuration method, device, user equipment, and base station.

BACKGROUND

In order to enable faster commercial use of 5th generation mobile networks (5G), the 3rd Generation Partnership Project (3GPP) has approved preferentially standardizing a Non-Stand Alone (NSA) scenario. The NSA scenario refers to an Evolved Universal Terrestrial Radio Access Network and New Radio Dual Connectivity (EN-DC) scenario realized by using an LTE base station as a primary base station and a 5G base station as a secondary base station. In the EN-DC scenario, a user equipment (UE) needs to maintain two communication links at the same time, namely a Long Term Evolution (LTE) communication link and a New Radio (NR) communication link.

Based on the research results of 3GPP, when the UE performs uplink transmission in two frequency bands, it may cause severe cross-modulation interference on downlink reception in a certain frequency band. However, the cross-modulation interference may not be generated by the UE in a combination of certain two specific channels of the two frequency bands.

SUMMARY

Embodiments of the present disclosure provide a resource configuration method, device, user equipment, and base station, which enables a base station to configure resources on a specific channel combination in different frequency band combinations for a UE on the basis of transmission capability of the UE by reporting the transmission capability on different channel combinations in different frequency band combinations by the UE, thereby improving the data transmission performance of the UE.

According to a first aspect of the present disclosure, there is provided a resource configuration method that can be applied to a base station. The method can include receiving transmission capability indication information reported by a UE, the transmission capability indication information being configured for indicating the transmission capability of the UE on different channel combinations in different frequency band combinations, and configuring time frequency resources supporting dual uplink transmission or time frequency resources supporting single uplink transmission for the UE based on the transmission capability indication information.

In an embodiment, the transmission capability of the UE on different channel combinations in different frequency band combinations can include capability of supporting, by the UE, single uplink transmission or dual uplink transmission on a channel combination in a frequency band combination.

In an embodiment, configuring time frequency resources supporting dual uplink transmission or time frequency resources supporting single uplink transmission for the UE based on the transmission capability indication information includes determining to configure the time frequency resources in two frequency bands for the UE when data for transmission by the UE meet a preset condition, and selecting a channel combination from the channel combinations supporting the dual uplink transmission, as resources for transmitting data simultaneously. Further, it can include configuring the time frequency resources supporting the single uplink transmission for the UE when the data for transmission by the UE do not meet the preset condition.

According to a second aspect of the present disclosure, there is provided a resource configuration method that can be applied to a UE. The method can include determining transmission capability indication information, the transmission capability indication information being configured for indicating transmission capability of the UE on different channel combinations in different frequency band combinations, and reporting the transmission capability indication information to a base station.

In an embodiment, determining transmission capability indication information can include setting a value of a corresponding identification bit in the transmission capability indication information to a first value when the transmission capability of the UE on a channel combination in a frequency band combination supports single uplink transmission, and setting the value of the corresponding identification bit in the transmission capability indication information to a second value when the transmission capability of the UE on the channel combination in the frequency band combination supports dual uplink transmission.

According to a third aspect of the embodiments of the present disclosure, there is provided a resource configuration device that can be applied to a base station. The device can include a receiving module that is configured to receive transmission capability indication information reported by a UE, the transmission capability indication information being configured for indicating transmission capability of the UE on different channel combinations in different frequency band combinations, and a resource configuration module that is configured to configure time frequency resources supporting dual uplink transmission or time frequency resources supporting single uplink transmission for the UE based on the transmission capability indication information.

In an embodiment, the transmission capability of the UE on different channel combinations in different frequency band combinations can include capability of supporting, by the UE, single uplink transmission or dual uplink transmission on a channel combination in a frequency band combination.

In an embodiment, the resource configuration module includes a first determining sub-module that is configured to determine to configure the time frequency resources in two frequency bands for the UE when data for transmission by the UE meet a preset condition, and a selecting sub-module that is configured to select a channel combination from the channel combinations supporting the dual uplink transmission, as resources for transmitting data simultaneously. Further, the device can include a configuration sub-module that is configured to configure the time frequency resources supporting the single uplink transmission for the UE when the data for transmission by the UE do not meet the preset condition.

According to a fourth aspect of the embodiments of the present disclosure, there is provided a resource configuration device that can be applied to a UE. The device can include a determining module that is configured to determine transmission capability indication information, the transmission capability indication information being configured for indicating transmission capability of the UE on different channel combinations in different frequency band combinations, and a reporting module that is configured to report the transmission capability indication information to a base station.

In an embodiment, the determining module include a first setting sub-module that is configured to set a value of a corresponding identification bit in the transmission capability indication information to a first value when the transmission capability of the UE on a channel combination in a frequency band combination supports single uplink transmission, and a second setting sub-module, configured to set the value of the corresponding identification bit in the transmission capability indication information to a second value when the transmission capability of the UE on the channel combination in the frequency band combination supports dual uplink transmission.

According to a fifth aspect of the embodiments of the present disclosure, there is provided a base station that can include a processor and a memory for storing instructions executable by the processor. The processor can be configured to receive transmission capability indication information reported by a UE, the transmission capability indication information being configured for indicating transmission capability of the UE on different channel combinations in different frequency band combinations, and configure time frequency resources supporting dual uplink transmission or time frequency resources supporting single uplink transmission for the UE based on the transmission capability indication information.

According to a sixth aspect of the embodiments of the present disclosure, there is provided a user equipment that can include a processor, and a memory for storing instructions executable by the processor. The processor is configured to determine transmission capability indication information, the transmission capability indication information being configured for indicating transmission capability of a UE on different channel combinations in different frequency band combinations, and report the transmission capability indication information to a base station.

According to a seventh aspect of the embodiments of the present disclosure, there is provided a non-transitory computer-readable storage medium having stored thereon computer instructions which, when executed by a processor, implement steps of receiving transmission capability indication information reported by a UE, the transmission capability indication information being configured for indicating transmission capability of the UE on different channel combinations in different frequency band combinations, and configuring time frequency resources supporting dual uplink transmission or time frequency resources supporting single uplink transmission for the UE based on the transmission capability indication information.

According to an eighth aspect of the embodiments of the present disclosure, there is provided a non-transitory computer-readable storage medium having stored thereon computer instructions which, when executed by a processor, implement steps of determining transmission capability indication information, the transmission capability indication information being configured for indicating transmission capability of a UE on different channel combinations in different frequency band combinations, and reporting the transmission capability indication information to a base station.

It should be understood that the foregoing general description and the following detailed description are merely exemplary and explanatory and should not be construed as restrictive of the disclosure.

BRIEF DESCRIPTION OF THE DRAWINGS

The accompanying drawings, which are incorporated in the specification and constitute a part of the specification, show exemplary embodiments of the present disclosure, and along with the specification, explain the principles of the present disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects of the present disclosure as recited in the appended claims.

In order to promote and standardize the EN-DC scenario, it is necessary to propose a solution of carrier configuration for the UE in the EN-DC scenario without impact of the cross-modulation interference generated by the UE.

Figure 1A:
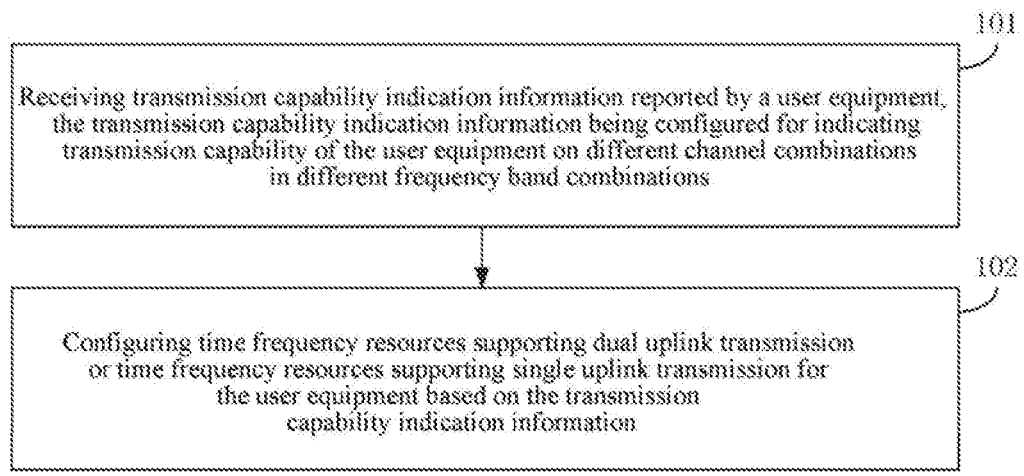
FIG. 1A is a flowchart showing a resource configuration method according to an exemplary embodiment.
Figure 1B:
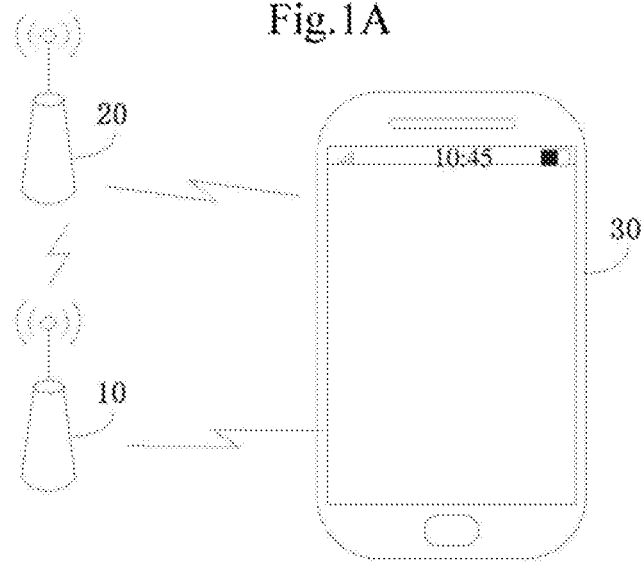
FIG. 1B is a diagram showing an application scenario of a resource configuration method according to an exemplary embodiment.
Figures 1C, 2:
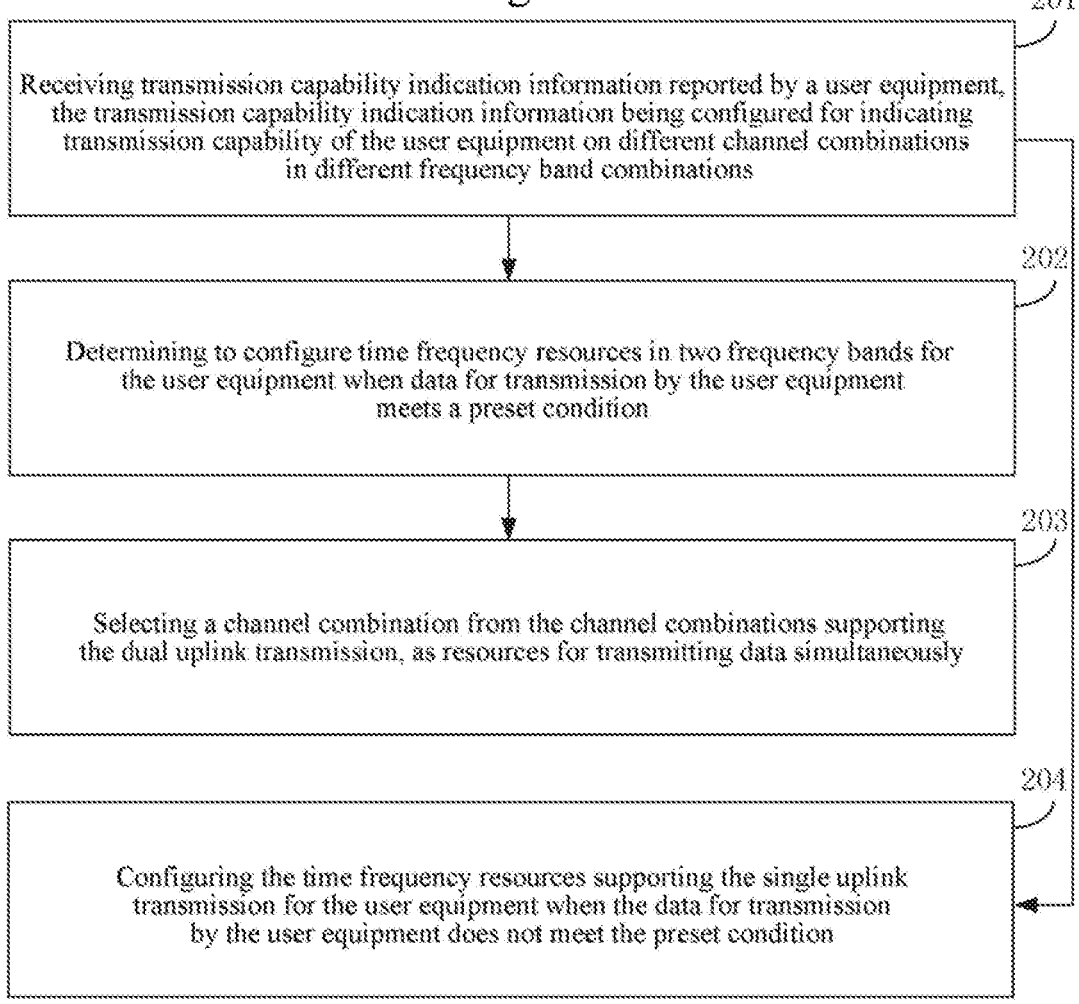
FIG. 1C is a schematic diagram showing transmission capability of a UE in a resource configuration showed in a form of a two-dimensional table according to an exemplary embodiment.
FIG. 2 is a flowchart showing another resource configuration method according to an exemplary embodiment.

FIG. 1A is a flowchart showing a resource configuration method according to an exemplary embodiment. FIG. 1B is a diagram showing an application scenario of a resource configuration method according to an exemplary embodiment. FIG. 1C is a schematic diagram showing transmission capability of a UE in a resource configuration showed in a form of a two-dimensional table according to an exemplary embodiment. The resource configuration method can be applied to a base station. As shown in FIG. 1A, the resource configuration method includes the following steps 101-102.

In step 101, transmission capability indication information reported by a UE is received, the transmission capability indication information being configured for indicating transmission capability of the UE on different channel combinations in different frequency band combinations.

In an embodiment, the transmission capability indication information reported by the UE may be embodied in a form of a two-dimensional array. For example, the transmission capability indication information is a capability-array [3][5]={{1, 0, 1, 0, 1}, {1, 1, 1, 1, 0}, {0, 0, 0, 1, 1}}, where the array is an array of three rows and five columns, and the rows can be used for recording band combinations, and the columns can be used for recording channel combinations. An element of 1 in the array may indicate that the user equipment supports dual uplink transmission over a corresponding channel combination in a corresponding frequency band combination, and an element of 0 in the array may indicate that the user equipment supports single uplink transmission over a corresponding channel combination in a corresponding frequency band combination. In an embodiment, the frequency band combination and the channel combination represented by each element in the two-dimensional array may be agreed in advance by the system, or may be indicated in the transmission capability indication information reported by the user equipment. For example, the user equipment may explicitly indicate that the element of array [0, 0] represents the user equipment's transmission capability over channel combination 1 in frequency band combination 1.

In an embodiment, the transmission capability indication information reported by the user equipment may be embodied in the form of the two-dimensional table. Referring to FIG. 1C, each row in the table indicates a frequency band combination, each column indicates a channel combination, and each cell indicates a channel combination in a frequency band combination. The frequency band combination indicated by each of the frequency band combinations 1, 2, 3, 4, 5, 6, and 7 can be agreed in advance by the protocol. For example, the frequency band combination 1 indicates a frequency band combination of a 1000 MHz frequency band and a 1100 MHz frequency band. The channel combination indicated by each of the channel combinations 1, 2, 3, and 4 can be agreed in advance by the protocol. For example, the channel combination 1 indicates a channel combination of a first channel in a first frequency band and a second channel in a second frequency band, that is, the channel combination 1 in the frequency band combination 1 indicates a combination of a first channel in the 1000 MHz frequency band and a second channel in the 1100 MHz frequency band.

Referring to HG. IC, cells of 1 in the two-dimensional table shown in the figure can indicate that the user equipment supports the dual uplink transmission on the corresponding channel combinations in the corresponding frequency band combinations, and cells of 0 in the two-dimensional table shown in the figure can indicate that the user equipment supports the single uplink transmission on the corresponding channel combinations in the corresponding frequency band combinations. In a case where the user equipment supports the dual uplink transmission on the corresponding channel combination in the corresponding frequency band combination, whether 1 is used to indicate this case or 0 is used to indicate this case can be agreed in advance by the system, while in a case where the user equipment supports the single uplink transmission on the corresponding channel combination in the corresponding frequency band combination, whether 0 is used to indicate this case or 1 is used to indicate this case can be agreed in advance by the system. 1 and 0 indicate two different transmission capabilities.

In an embodiment, the transmission capability of the UE on different channel combinations in different frequency band combinations includes capability of supporting the dual uplink transmission on the different channel combinations in the different frequency band combinations. For example, the user equipment supports the dual uplink transmission on the combination of the first channel in the 1000 MHz frequency band and the second channel in the 1100 MHz frequency band, which indicates that the cross-modulation interference will not occur when resources on this channel combination in this frequency band combination are configured for the user equipment. In another embodiment, the transmission capability of the UE on different channel combinations in different frequency band combinations includes capability of supporting the single uplink transmission on the different channel combinations in the different frequency band combinations. For example, the user equipment supports the single uplink transmission on the combination of a first channel in a 800 MHz frequency band and a second channel in a 900 MHz frequency band, which indicates that the cross-modulation interference will occur when the resources on this channel combination in this frequency band combination are configured for the user equipment.

In an embodiment, one frequency band combination may include more than two frequency bands, and one channel combination may also include more than two channels.

In an embodiment, supporting the dual uplink transmission can be understood as that the cross-modulation interference will not occur when data are transmitted in the frequency band combination simultaneously, while supporting the single uplink transmission can be understood as that the data cannot be simultaneously transmitted in the frequency band combination.

In step 102, time frequency resources supporting dual uplink transmission or time frequency resources supporting single uplink transmission are configured for the UE based on the transmission capability indication information.

In one embodiment, based on the transmission capability indication information reported by the user equipment, it can be determined on which channel combinations and in which frequency band combinations the user equipment supports the dual uplink transmission, that is, no cross-modulation interference will occur when transmitting data simultaneously. As such, the time frequency resources on the channel combinations on which no cross-modulation interference will occur are configured for the UE when necessary. For example, if the user equipment reports that the dual uplink transmission is supported on the combination of the first channel in the 1000 MHz frequency band and the second channel in the 1100 MHz frequency band, the time-frequency resources for transmitting data on the first channel in the 1000 MHz frequency band and on the second channel in the 1100 MHz frequency band simultaneously can be configured for the user equipment when an amount of data for transmission by the user equipment is relatively large or a delay tolerance of the data for transmission is relatively low.

In an exemplary scenario, as shown in FIG. 1B, a LTE base station 10 as a primary base station, a 5G base station 20 as a secondary base station, and a user equipment 30 are deployed in the EN-DC scenario. The LTE base station 10 and/or the 5G base station 20 can determine, based on the transmission capability of the UE 30 on different channel combinations in different frequency band combinations, on which channel combinations and in which frequency band combinations the user equipment will transmit the data without incurring the cross-modulation interference, and configure for the user equipment 30 the time-frequency resources which will not incur the cross-modulation interference, thereby improving the data transmission performance of the user equipment 30.

In this embodiment, through the above steps 101 to 102, the base station can configure the time frequency resources supporting the dual uplink transmission for the UE based on the transmission capability of the UE when it is necessary to configure the time frequency resources on the two frequency bands for the UE, thereby improving the data transmission performance of the UE while avoiding the cross-modulation interference.

The technical solutions provided in the embodiments of the present disclosure will be described below in specific embodiments.

FIG. 2 is a flowchart showing another resource configuration method according to an exemplary embodiment. In the present embodiment, an example in which a base station configures time frequency resources for a UE based on the obtained transmission capability of the UE by using the above method provided by the embodiment of the present disclosure is described illustratively. As shown in FIG. 2, the method can include the following steps.

In step 201, transmission capability indication information reported by a UE is received, the transmission capability indication information being configured for indicating transmission capability of the UE on different channel combinations in different frequency band combinations. Then step 202 or step 204 is performed. In an embodiment, reference can be made to the description of step 101 in the embodiment shown in FIG. 1A for details of the step 201, and it will not be repeated here.

In step 202, it is determined to configure time frequency resources in two frequency bands for the UE when data for transmission by the UE meet a preset condition. In an embodiment, the data for transmission by the UE meeting the preset condition can be understood as that the amount of data for transmission by the UE is relatively large or a data type of the data for transmission is an emergency transaction, a high priority transaction, or a transaction with low delay tolerance, and the base station may determine that it needs to configure the time frequency resources in two frequency bands for the UE to simultaneously transmit the data so as to improve the data transmission efficiency.

In step 203, a channel combination is selected from channel combinations supporting dual uplink transmission, as the resources for transmitting data simultaneously.

In step 204, the time frequency resources supporting single uplink transmission are configured for the UE when the data for transmission by the UE do not meet the preset condition. In an embodiment, based on the transmission capability indication information reported by the user equipment, it can be determined on which channel combinations and in which frequency band combinations the user equipment supports the dual uplink transmission, that is, no cross-modulation interference will occur when transmitting data simultaneously. As such, when the data for transmission by the UE meet the preset condition, the time frequency resources on the channel combination which will not incur the cross-modulation interference are configured for the UE.

In this embodiment, the base station can configure the time frequency resources for the UE properly based on the transmission capability of the UE on different channel combinations in different frequency band combinations, which improves the data transmission performance of the UE.

Figure 3:
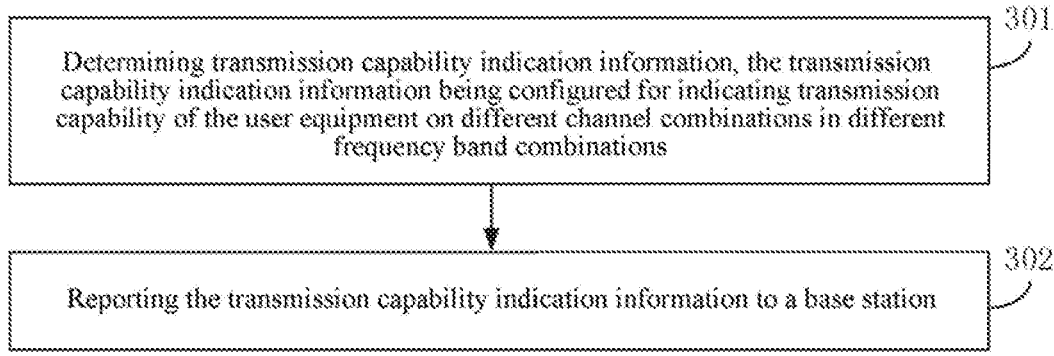
FIG. 3 is a flowchart showing a resource configuration method according to an exemplary embodiment.

FIG. 3 is a flowchart illustrating yet another resource configuration method according to an exemplary embodiment. The resource configuration method can be applied to a UE. As shown in FIG. 3, the resource configuration method includes the following steps 301-302.

In step 301, transmission capability indication information is determined, the transmission capability indication information being configured for indicating transmission capability of the UE on different channel combinations in different frequency band combinations.

In an embodiment, the transmission capability indication information is embodied in a form of a two-dimensional array. In another embodiment, the transmission capability indication information may also be embodied in a form of a two-dimensional table. Referring to FIG. 1C, in the two-dimensional table, each row indicates a frequency band combination, each column indicates a channel combination, and each cell indicates the transmission capability on a channel combination in a frequency band combination. Based on a value in each cell, the transmission capability of the UE on the channel combination in the frequency band combination can be determined. For example, the value of the cell for frequency band combination 1 and channel combination 1 is 1, which may indicate that the transmission capability of the UE on the channel combination 1 in the frequency band combination 1 is the capability of supporting the dual uplink transmission.

The two-dimensional array can also be understood as a two-dimensional matrix which includes a row matrix and a column matrix. Each row can indicate a frequency band combination, and each column can indicate a channel combination. For example, the transmission capability indication information of capability-array [3] [5]={{1, 0, 1, 0, 1}, {1, 1, 1, 1, 0}, {0, 0, 0, 1, 1}} may indicate the transmission capability on five channel combinations corresponding to each of three frequency band combinations.

In an embodiment, each UE may determine the transmission capability indication information based on the transmission capability on each of the channel combination in each of the frequency band combinations.

Further, each UE can determine the transmission capability on different channel combinations in different frequency band combinations through a self-test of a radio frequency module. In another embodiment, the transmission capability of the UE on different channel combinations in different frequency band combinations can also be configured by an equipment supplier as product parameters at the factory, and it does not need to be determined by the user equipment through the self-test.

In step 302, the transmission capability indication information is reported to a base station.

In an embodiment, the transmission capability indication information may be reported to the base station through a UE-EUTRA-Capability signaling for the network capability supported by the UE. The UE may actively report the transmission capability indication information when accessing the base station, or report the transmission capability indication information based on a request message sent by the base station upon receiving the request message. Further, the transmission capability indication information may be reported to the primary base station and/or the secondary base station.

In an exemplary scenario, as shown in FIG. 1B, a LTE base station 10 as a primary base station, a 5G base station 20 as a secondary base station, and a UE 30 are deployed in the EN-DC scenario. The UE 30 can report the transmission capability indication information to the LIE base station 10 and/or the 5G base station 20, so that the base station can determine, based on the transmission capability of the UE 30 on different channel combinations in different frequency band combinations, on which channel combinations and in which frequency band combinations the UE 30 will transmit the data without incurring the cross-modulation interference, and configure for the UE 30 the time-frequency resources which will not incur the cross-modulation interference, thereby improving the data transmission performance of the user equipment 30.

In this embodiment, through the above steps 301 to 302, the UE can report the transmission capability in different frequency band combinations to the base station, so that the base station can configure for the user equipment the time-frequency resources on the channel combinations which will not incur the cross-modulation interference, thereby improving the data transmission performance of user equipment.

Figure 4:
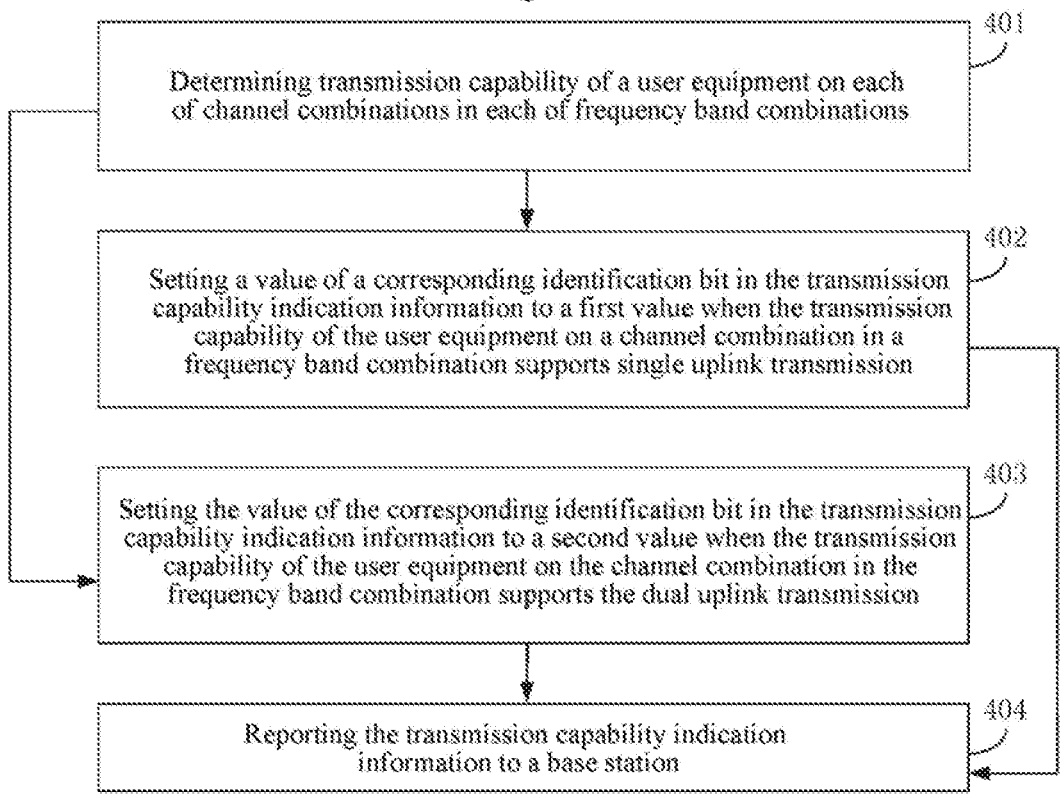
FIG. 4 is a flowchart showing still another resource configuration method according to an exemplary embodiment.

FIG. 4 is a flowchart illustrating still another resource configuration method according to an exemplary embodiment. In the present embodiment, an example of how the UE determines a response signaling by using the above method provided by the embodiment of the present disclosure is described illustratively. As shown in FIG. 4, the method includes the following steps.

In step 401, transmission capability of a UE on each of channel combinations in each of frequency band combinations is determined. Then step 402 or step 403 is performed. In an embodiment, the transmission capability may be the capability of supporting single uplink transmission, or the capability of supporting dual uplink transmission.

In step 402, when the transmission capability of the UE on a channel combination in a frequency band combination supports the single uplink transmission, a value of a corresponding identification bit in the transmission capability indication information is set to a first value. Then step 404 is performed. In an embodiment, the first value may be 1 or 0, and which value is used to represent the transmission capability of supporting the single uplink transmission by the UE may be agreed by the system.

The corresponding identification bit in the transmission capability indication information can be understood as a corresponding array element in the two-dimensional array or a corresponding cell in the two-dimensional table. Assuming the first value is 1, the identification bit in the two-dimensional array or the two-dimensional table, which is corresponding to each channel combination in each frequency band combination that supports the single uplink transmission, is set to 1.

In step 403, when the transmission capability of the UE on a channel combination in a frequency band combination supports the dual uplink transmission, the value of the corresponding identification bit in the transmission capability indication information is set to a second value. In an embodiment, the second value is a value different from the first value. If the first value is 1, the second value is 0. Otherwise, if the second value is 1, the first value is 0.

In step 404, the transmission capability indication information is reported to the base station. In an embodiment, the transmission capability indication information may be reported to the base station through a UE-EUTRA-Capability signaling of the network capability supported by the UE. The UE may generate the transmission capability indication information based on the transmission capability on each channel combination in each frequency band combination, so that the base station configures the time frequency resources for the UE based on the transmission capability indication information.

Figure 5:
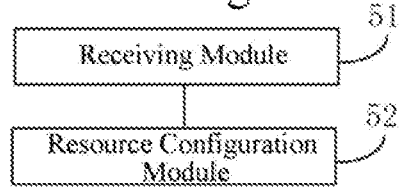
FIG. 5 is a block diagram showing a resource configuration device according to an exemplary embodiment.

FIG. 5 is a block diagram showing a resource configuration device according to an exemplary embodiment, which can be applied to a base station. As shown in FIG. 5, the resource configuration device may include a receiving module 51 that is configured to receive transmission capability indication information reported by a UE, the transmission capability indication information being configured for indicating transmission capability of the UE on different channel combinations in different frequency band combinations, and a resource configuration module 52 that is configured to configure time frequency resources supporting dual uplink transmission or time frequency resources supporting single uplink transmission for the UE based on the transmission capability indication information.

Figure 6:
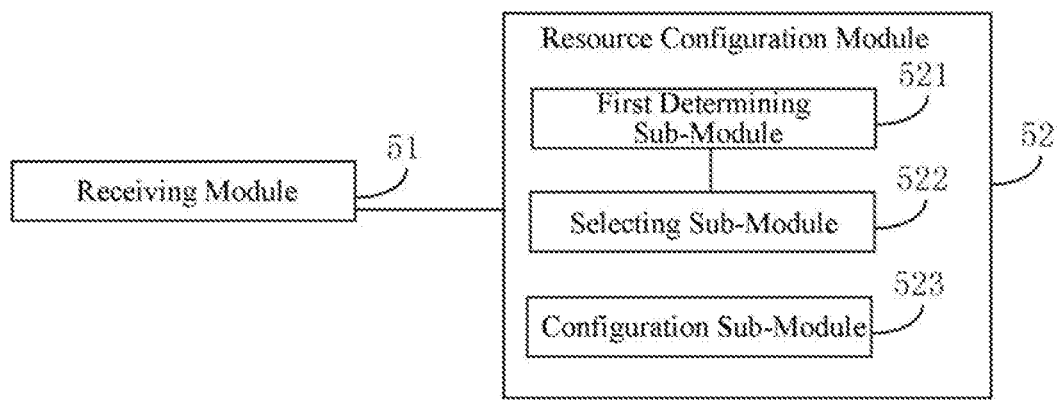
FIG. 6 is a block diagram showing another resource configuration device according to an exemplary embodiment.

FIG. 6 is a block diagram showing another resource configuration device according to an exemplary embodiment. As shown in FIG. 6, based on the embodiment shown in FIG. 5 above, in an embodiment, the transmission capability of the UE on different channel combinations in different frequency band combinations can include the capability of supporting, by the UE, single uplink transmission or dual uplink transmission on a channel combination in a frequency band combination.

In an embodiment, the resource configuration module 52 can include a first determining sub-module 521 that is configured to determine that it needs to configure the time frequency resources in two frequency bands for the UE when data for transmission by the UE meet a preset condition, and a selecting sub-module 522 that is configured to select a channel combination from the channel combinations which support the dual uplink transmission, as resources for transmitting data simultaneously. The resource configuration module 52 can also include a configuration sub-module 523 that is configured to configure the time frequency resources supporting the single uplink transmission for the UE when the data for transmission by the UE do not meet the preset condition.

Figure 7:
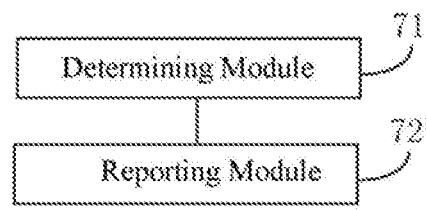
FIG. 7 is a block diagram showing a resource configuration device according to an exemplary embodiment.

FIG. 7 is a block diagram showing a resource configuration device according to an exemplary embodiment, which is applied to a UE. As shown in FIG. 7, the resource configuration device may include a determining module 71 that is configured to determine transmission capability indication information, the transmission capability indication information being configured for indicating transmission capability of the UE on different channel combinations in different frequency band combinations, and a reporting module 72 configured to report the transmission capability indication information to a base station.

Figure 8:
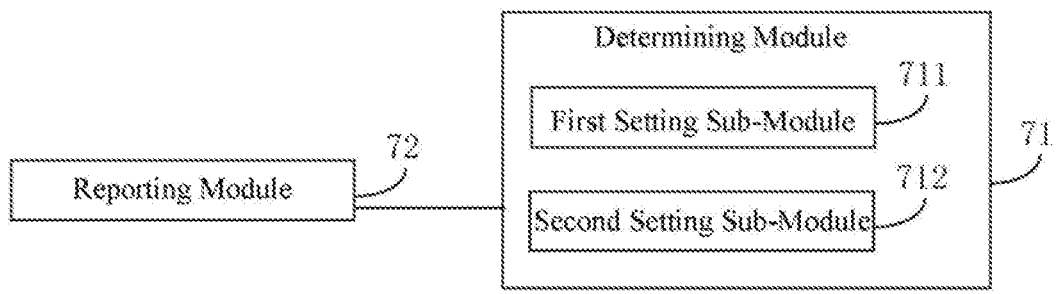
FIG. 8 is a block diagram showing another resource configuration device according to an exemplary embodiment.

FIG. 8 is a block diagram showing another resource configuration device according to an exemplary embodiment. As shown in FIG. 8, based on the above embodiment shown in FIG. 7, in an embodiment, the determining module 71 can include a first setting sub-module 711 that is configured to set a value of a corresponding identification bit in the transmission capability indication information to a first value when the transmission capability of the UE on a channel combination in a frequency band combination supports single uplink transmission, and a second setting submodule 712 that is configured to set the value of the corresponding identification bit in the transmission capability indication information to a second value when the transmission capability of the UE on the channel combination in the frequency band combination supports dual uplink transmission.

Figure 9:
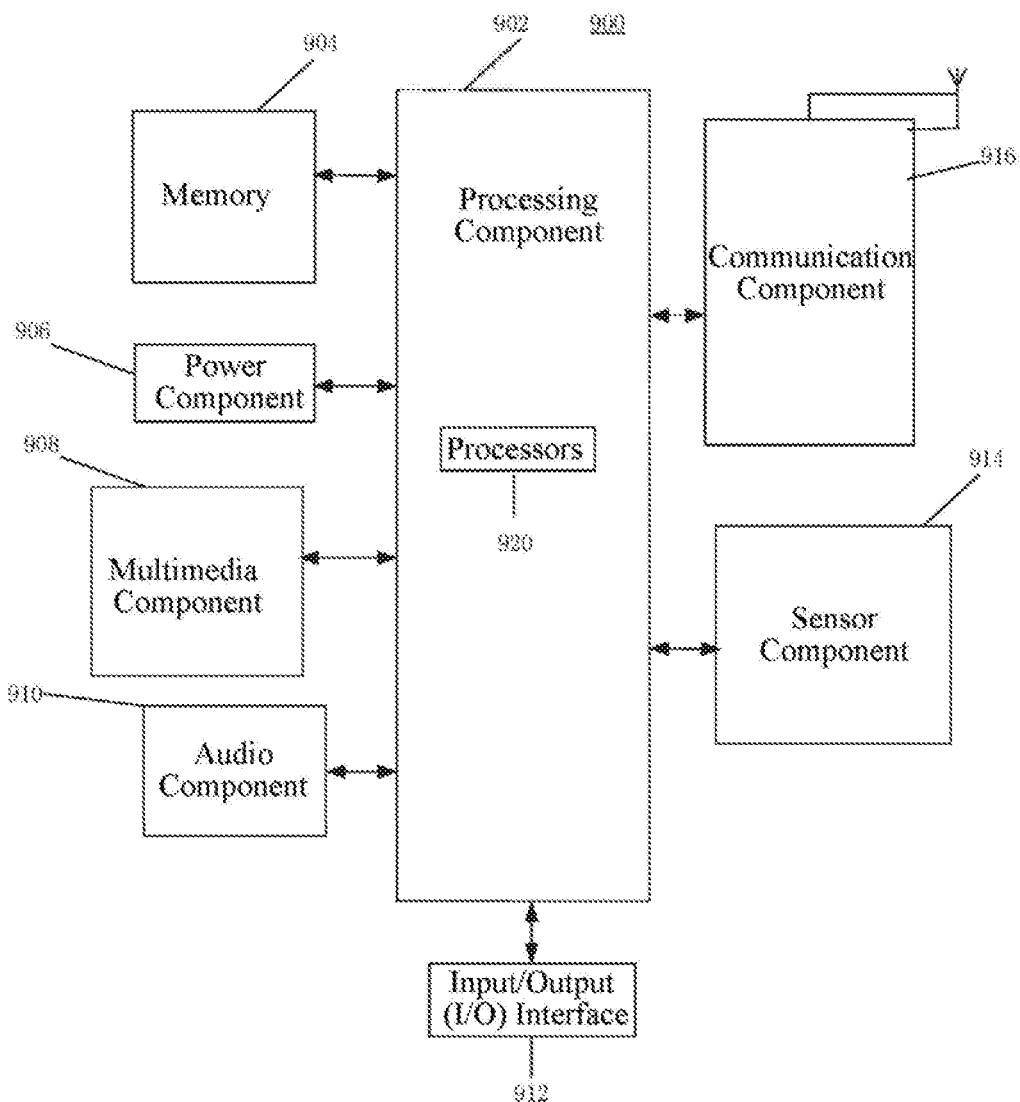
FIG. 9 is a block diagram showing a device applicable for resource configuration according to an exemplary embodiment.

FIG. 9 is a block diagram showing a device applicable for resource configuration according to an exemplary embodiment. For example, the device 900 may be a UE such as a mobile phone, a computer, a digital broadcasting terminal, a messaging device, a game console, a tablet device, a medical device, a fitness device, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules to facilitate the interaction between the processing component 902 and other components. For example, the processing component 902 can include a multimedia module to facilitate the interaction between the multimedia component 908 and the processing component 902.

The memory 904 is configured to store various types of data to support the operation of the device 900. Examples of such data include instructions for any application or method operated on device 900, contact data, phone book data, messages, pictures, videos, and the like. The memory 904 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 can include a power management system, one or more power sources, and other components associated with the generation, management, and distribution of power in the device 900.

The multimedia component 908 includes a screen providing an output interface between the device 900 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. When the device 900 is in an operation mode, such as a photographing mode or a video mode, the front camera and/or the rear camera can receive external multimedia datum. Each of the front camera and the rear camera may be a fixed optical lens system or have focus and optical zoom capability.

The audio component 910 is configured to output and/or input an audio signal. For example, the audio component 910 includes a microphone (MIC) configured to receive an external audio signal when the device 900 is in an operation mode, such as a call mode, a recording mode, and a voice recognition mode. The received audio signal may be further stored in the memory 904 or sent via the communication component 916. In some embodiments, the audio component 910 also includes a speaker for outputting the audio signal.

The I/O interface 912 provides an interface between the processing component 902 and peripheral interface modules, such as a keyboard, a click wheel, buttons, and the like. These buttons may include, but are not limited to, a home button, a volume button, a starting button, and a locking button.

The sensor component 914 includes one or more sensors for providing status assessments of various aspects of the device 900. For example, the sensor component 914 can detect an open/closed status of the device 900, relative positioning of components, such as the display and the keypad of the device 900. The sensor component 914 can also detect a change in position of the device 900 or a component of the device 900, a presence or absence of user contact with the device 900, an orientation, or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, configured to use in imaging applications. In some embodiments, the sensor component 914 may also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as WiFi, 2G or 3G, or a combination thereof. In an exemplary embodiment, the communication component 916 receives broadcast signals or broadcast associated information from an external broadcast management system via a broadcast channel. In an exemplary embodiment, the communication component 916 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components to perform the above method.

In an exemplary embodiment, there is also provided a non-transitory computer-readable storage medium including instructions, such as included in the memory 90, executable by the processor 920 of the device 900, for performing the above described method in the second aspect: determining transmission capability indication information, the transmission capability indication information being configured for indicating transmission capability of a UE on different channel combinations in different frequency band combinations; and reporting the transmission capability indication information to a base station.

In an embodiment, the non-transitory computer readable storage medium may be a ROM, a random access memory (RAM), a CD-ROM, a magnetic tape, a floppy disc, and an optical data storage device.

Figure 10:
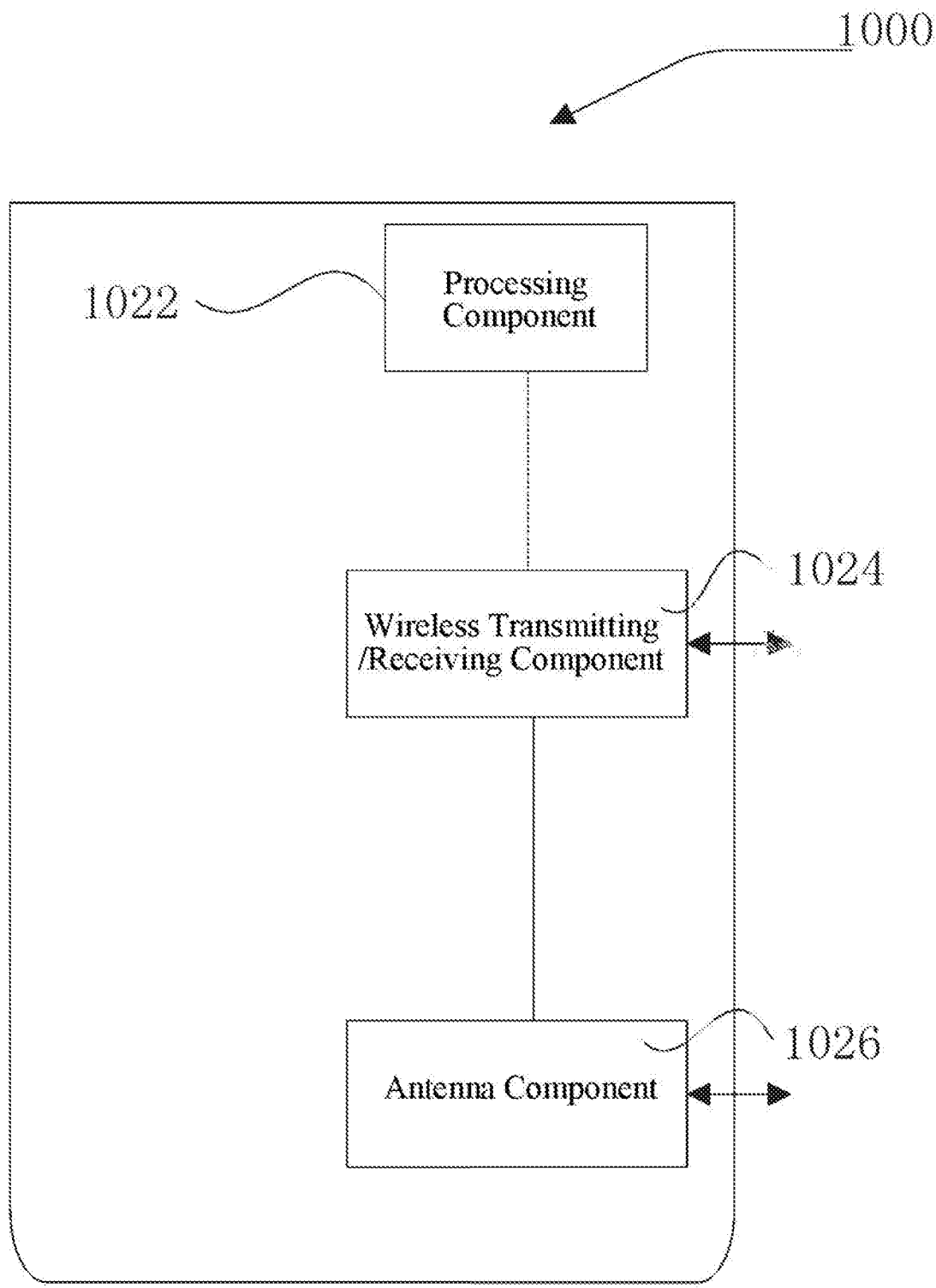
FIG. 10 is a block diagram showing a device applicable for resource configuration according to an exemplary embodiment.

FIG. 10 is a block diagram showing a device applicable for data transmission according to an exemplary embodiment. The device 1000 may be provided as a base station. Referring to FIG. 10, the device 1000 includes a processing component 1022, a wireless transmitting/receiving component 1024, an antenna component 1026, and a signal processing part specific to the wireless interface. The processing component 1022 may further include one or more processors.

One of the processors in the processing component 1022 can be configured to perform the resource configuration method described in the second aspect above.

In an exemplary embodiment, there is also provided a non-transitory computer-readable storage medium including instructions which is executable by the processing component 1022 of the device 1000 to perform the method described in the first aspect above: receiving transmission capability indication information reported by a UE, the transmission capability indication information being configured for indicating transmission capability of the UE on different channel combinations in different frequency band combinations; and configuring time frequency resources supporting dual uplink transmission or time frequency resources supporting single uplink transmission for the UE based on the transmission capability indication information.

In an embodiment, the non-transitory computer readable storage medium may be a ROM, a random access memory (RAM), a CD-ROM, a magnetic tape, a floppy disc, and an optical data storage device.

According to the embodiments of the present disclosure, the UE may report the transmission capability of the UE on different channel combinations in different frequency band combinations, and the base station can configure time frequency resources supporting dual uplink transmission for the CE based on the transmission capability of the UE when it is necessary to configure time-frequency resources in the two frequency bands for the UE, thereby improving the data transmission performance of the UE while avoiding the cross-modulation interference.

Other embodiments of the present disclosure will be apparent to those skilled in the art from consideration of the specification and practice of the present disclosure disclosed herein. The present application is intended to cover any variations, uses, or adaptations of the present disclosure following the general principles of the present disclosure and including common general knowledge or conventional technical measures in the art that are not disclosed in the present disclosure. It is intended that the specification and examples be considered as exemplary only, with a true scope and spirit of the present disclosure being indicated by the following claims.

It should be understood that the present disclosure is not limited to the exact construction that has been described above and illustrated in the accompanying drawings, and that various modifications and changes can be made without departing from the scope thereof.

What is claimed is:

1. A resource configuration method that is applied to a base station, the method comprising:
receiving transmission capability indication information of a user equipment, the transmission capability indication information indicating a transmission capability of the user equipment on different channel combinations in different frequency band combinations, wherein the transmission capability of the user equipment on different channel combinations in different frequency band combinations comprises a capability of supporting, by the user equipment, single uplink transmission or dual uplink transmission on a channel combination in a frequency band combination; and
configuring time frequency resources to support dual uplink transmission or single uplink transmission for the user equipment based on the transmission capability indication information, the configuring comprising:
determining to configure the time frequency resources in two frequency bands for the user equipment when data for transmission by the user equipment meet a preset condition;
selecting a channel combination from the channel combinations supporting the dual uplink transmission as resources for transmitting data simultaneously; and
configuring the time frequency resources supporting the single uplink transmission for the user equipment when the data for transmission by the user equipment fail to meet the preset condition.

2. The method according to claim 1, wherein one frequency band combination comprises two or more frequency bands, and one channel combination comprises two or more channels.

3. A resource configuration method that is applied to user equipment, the method comprising:
determining transmission capability indication information, the transmission capability indication information being configured for indicating a transmission capability of the user equipment on different channel combinations in different frequency band combinations; and
reporting the transmission capability indication information to a base station,
wherein determining the transmission capability indication information further comprises:
setting a value of a corresponding identification bit in the transmission capability indication information to a first value when the transmission capability of the user equipment on a channel combination in a frequency band combination supports single uplink transmission; and
setting the value of the corresponding identification bit in the transmission capability indication information to a second value when the transmission capability of the user equipment on the channel combination in the frequency band combination supports dual uplink transmission.

4. The method according to claim 3, wherein one frequency band combination comprises two or more frequency bands, and one channel combination comprises two or more channels.

5. A base station, comprising:
a processor; and
a memory for storing instructions executable by the processor;
wherein the processor is configured to:
receive transmission capability indication information reported by a user equipment, the transmission capability indication information being configured for indicating transmission capability of the user equipment on different channel combinations in different frequency band combinations, wherein the transmission capability of the user equipment on different channel combinations in different frequency band combinations comprises a capability of supporting, by the user equipment, single uplink transmission or dual uplink transmission on a channel combination in a frequency band combination, and configure time frequency resources to support dual uplink transmission or single uplink transmission for the user equipment based on the transmission capability indication information, wherein the processor is further configured to:

determine to configure the time frequency resources in two frequency bands for the user equipment when data for transmission by the user equipment meet a preset condition;

select a channel combination from the channel combinations supporting the dual uplink transmission as resources for transmitting data simultaneously; and configure the time frequency resources to support the single uplink transmission for the user equipment when the data for transmission by the user equipment do not meet the preset condition.

6. The base station according to claim 5, wherein one frequency band combination comprises two or more frequency bands, and one channel combination comprises two or more channels.

7. User equipment, comprising:

a processor; and a memory for storing instructions executable by the processor;

wherein the processor is configured to:

determine transmission capability indication information, the transmission capability indication information being configured for indicating transmission capability of the user equipment on different channel combinations in different frequency band combinations, and report the transmission capability indication information to a base station, wherein the processor is further configured to:

set a value of a corresponding identification bit in the transmission capability indication information to a first value when the transmission capability of the user equipment on a channel combination in a frequency band combination supports single uplink transmission; and set the value of the corresponding identification bit in the transmission capability indication information to a second value when the transmission capability of the user equipment on the channel combination in the frequency band combination supports dual uplink transmission.

8. The user equipment according to claim 7, wherein one frequency band combination comprises two or more frequency bands, and one channel combination comprises two or more channels.

* * * * *